(12) United States Patent
Howlid et al.

(10) Patent No.: US 7,957,220 B2
(45) Date of Patent: Jun. 7, 2011

(54) ACTIVE STEERING FOR MARINE SEISMIC SOURCES

(75) Inventors: Martin Howlid, Slependen (NO); Rohitashva Singh, Houston, TX (US)

(73) Assignee: WesternGeco L.L.C., Houston, TX (US)

( * ) Notice: Subject to any disclaimer, the term of this patent is extended or adjusted under 35 U.S.C. 154(b) by 619 days.

(21) Appl. No.: 10/552,795

(22) PCT Filed: Apr. 15, 2004

(86) PCT No.: PCT/EP2004/050527
§ 371 (c)(1),
(2), (4) Date: Jul. 13, 2006

(87) PCT Pub. No.: WO2004/092771
PCT Pub. Date: Oct. 28, 2004

(65) Prior Publication Data
US 2007/0019504 A1    Jan. 25, 2007

(30) Foreign Application Priority Data
Apr. 15, 2003 (GB) .................................. 0308632.9

(51) Int. Cl.
*G01V 1/00* (2006.01)
(52) U.S. Cl. .............................. 367/16; 367/17; 367/153
(58) Field of Classification Search .............. 367/15–17, 367/153, 154; 114/242, 246
See application file for complete search history.

(56) References Cited

U.S. PATENT DOCUMENTS

| | | | |
|---|---|---|---|
| 3,412,704 A | 11/1968 | Buller et al. | |
| 3,479,638 A | 11/1969 | Rusnak | |
| 3,730,483 A | 5/1973 | Newell | |
| 3,921,124 A | 11/1975 | Payton | |
| 3,953,826 A | 4/1976 | Brundrit et al. | |
| 4,027,616 A | 6/1977 | Guenther et al. | |
| 4,033,278 A | 7/1977 | Waters | |
| 4,063,213 A | 12/1977 | Itria et al. | |
| 4,087,780 A | 5/1978 | Itria et al. | |
| 4,110,726 A | 8/1978 | Dorrance et al. | |
| 4,134,098 A | 1/1979 | Ruehle | |

(Continued)

FOREIGN PATENT DOCUMENTS

EP    0 018 053 A1    10/1980

(Continued)

OTHER PUBLICATIONS

WORLDOIL.COM, Western and Geco merge; streamers that can be steered, Jul. 2000 vol. 221 No. 7.

(Continued)

*Primary Examiner* — Mark Hellner

(57) ABSTRACT

A seismic survey system having a source array (11) coupled to a deflector device (15) that controls the position of the source array. A positioning system unit (16) is mounted on the source array to provide a signal to a controller, informing the controller of the current position of the source array so that the controller can control the position of the deflector device (15) and the coupled source array. A seismic source (14) on the source array may be triggered when the source array is at a desired location as measured by the positioning system unit. The deflector device (15) comprises one or more wings (18) in a generally vertical or, alternatively, in a generally horizontal arrangement disposed adjacent to a central body (19). The streamlined central body has connection points that allow the deflector device (15) to be connected to a tow cable (13) from the tow vessel (12) and to the source array (11).

32 Claims, 6 Drawing Sheets

U.S. PATENT DOCUMENTS

| | | | |
|---|---|---|---|
| 4,323,989 A * | 4/1982 | Huckabee et al. | 367/17 |
| 4,404,664 A | 9/1983 | Zachariadis | |
| 4,485,686 A | 12/1984 | Olmstead, Jr. et al. | |
| 4,506,352 A | 3/1985 | Brandsaeter et al. | |
| 4,693,336 A | 9/1987 | Newman | |
| 4,716,553 A * | 12/1987 | Dragsund et al. | 367/15 |
| 4,719,987 A * | 1/1988 | George, Jr. et al. | 181/114 |
| 4,727,956 A | 3/1988 | Huizer | |
| 4,729,333 A * | 3/1988 | Kirby et al. | 114/244 |
| 4,748,599 A * | 5/1988 | Gjestrum et al. | 367/17 |
| 4,798,156 A | 1/1989 | Langeland et al. | |
| 4,845,686 A | 7/1989 | Brac | |
| 4,862,422 A | 8/1989 | Brac | |
| 4,868,793 A | 9/1989 | Dunbar | |
| 4,890,568 A * | 1/1990 | Dolengowski | 114/246 |
| 4,960,183 A | 10/1990 | Young, II | |
| 4,974,212 A | 11/1990 | Sheiman | |
| 5,052,814 A | 10/1991 | Stubblefield | |
| 5,113,377 A | 5/1992 | Johnson | |
| 5,142,498 A | 8/1992 | Duren | |
| 5,144,588 A * | 9/1992 | Johnston et al. | 367/16 |
| 5,184,329 A | 2/1993 | Regnault et al. | |
| 5,281,773 A | 1/1994 | Duren | |
| 5,353,223 A | 10/1994 | Norton et al. | |
| 5,448,233 A | 9/1995 | Saban et al. | |
| 5,523,951 A | 6/1996 | Kriesgman et al. | |
| 5,532,975 A * | 7/1996 | Elholm | 367/16 |
| 5,619,474 A | 4/1997 | Kuche | |
| 5,771,202 A | 6/1998 | Bale et al. | |
| 5,784,335 A | 7/1998 | Deplante et al. | |
| 5,790,472 A | 8/1998 | Workman et al. | |
| 5,920,828 A | 7/1999 | Norris et al. | |
| 5,924,049 A | 7/1999 | Beasley et al. | |
| 5,995,452 A | 11/1999 | Bouyoucus | |
| 6,005,828 A | 12/1999 | Carroll et al. | |
| 6,011,752 A | 1/2000 | Ambs et al. | |
| 6,011,753 A | 1/2000 | Chien | |
| 6,028,817 A | 2/2000 | Ambs | |
| 6,031,789 A | 2/2000 | Broussard et al. | |
| 6,088,298 A | 7/2000 | Onat | |
| 6,091,670 A * | 7/2000 | Oliver et al. | 367/76 |
| 6,256,589 B1 | 7/2001 | Gallotti Guimaraes | |
| 6,292,436 B1 | 9/2001 | Rau et al. | |
| 6,459,653 B1 | 10/2002 | Kuche | |
| 6,504,792 B2 | 1/2003 | Barker et al. | |
| 6,510,390 B1 | 1/2003 | Bunting et al. | |
| 6,525,992 B1 | 2/2003 | Olivier et al. | |
| 6,590,831 B1 | 7/2003 | Bennett et al. | |
| 6,606,958 B1 | 8/2003 | Bouyoucos | |
| 6,618,321 B2 | 9/2003 | Brunet | |
| 6,671,223 B2 | 12/2003 | Bittleston | |
| 6,681,710 B2 | 1/2004 | Semb | |
| 6,691,038 B2 | 2/2004 | Zajac | |
| 6,839,302 B2 | 1/2005 | Austad et al. | |
| 6,873,571 B2 | 3/2005 | Clayton et al. | |
| 6,932,017 B1 | 8/2005 | Hillesund et al. | |
| 7,047,898 B2 | 5/2006 | Petersen et al. | |
| 7,446,706 B2 | 11/2008 | Riley et al. | |
| 2002/0174817 A1 | 11/2002 | Semb | |
| 2003/0039170 A1 | 2/2003 | Soreau et al. | |
| 2003/0151974 A1 | 8/2003 | Kutty et al. | |
| 2003/0168277 A1 | 9/2003 | Hopperstad et al. | |
| 2003/0208320 A1 * | 11/2003 | Zajac | 702/14 |
| 2003/0220745 A1 | 11/2003 | Campbell | |
| 2004/0060498 A1 | 4/2004 | Petersen | |
| 2004/0136266 A1 | 7/2004 | Howlid et al. | |
| 2004/0196737 A1 | 10/2004 | Nicholson | |
| 2005/0180263 A1 | 8/2005 | Lambert et al. | |
| 2005/0219948 A1 | 10/2005 | Naess | |
| 2008/0279042 A1 | 11/2008 | Storteig et al. | |
| 2009/0141587 A1 | 6/2009 | Welker et al. | |

FOREIGN PATENT DOCUMENTS

| | | |
|---|---|---|
| EP | 0018053 B1 | 10/1980 |
| EP | 0168959 B1 | 1/1986 |
| EP | 0 319 716 A2 | 6/1989 |
| EP | 0 321 705 A2 | 6/1989 |
| EP | 0 525 391 A1 | 2/1993 |
| EP | 0 613 025 A1 | 8/1994 |
| GB | 2320706 A | 7/1998 |
| GB | 2 364 388 A | 1/2002 |
| GB | 2 390 589 | 1/2004 |
| GB | 2 400 662 | 10/2004 |
| GB | 2 412 965 A | 10/2005 |
| GB | 2 414 804 | 12/2005 |
| WO | WO 0020892 A1 | 4/2000 |
| WO | WO 0020895 A1 | 4/2000 |
| WO | WO 0116623 A1 | 3/2001 |
| WO | 01 55747 A1 | 8/2001 |
| WO | WO 0161380 A2 | 8/2001 |
| WO | WO 01/84186 | 11/2001 |
| WO | WO 0247968 A1 | 6/2002 |
| WO | WO 02059650 A1 | 8/2002 |
| WO | WO 02103393 A2 | 12/2002 |
| WO | WO 2004/092771 | 10/2004 |
| WO | 2005 096015 A1 | 10/2005 |
| WO | 2005 096018 A1 | 10/2005 |

OTHER PUBLICATIONS

Christie, Oilfield Review Summer 2001, Raising the standards of seismic data quality.

RCE Amendment (Aug. 7, 2010), Final Office Action (Feb. 19, 2010), Response to Office Action (Dec. 1, 2009), and Office Action (Sep. 2, 2009); U.S. Appl. No. 10/598,732 (US 2009-0141587 A1—Welker, et al).

Response to Office Action (Jul. 14, 2010) and Office Action (Apr. 15, 2010); U.S. Appl. No. 12/175,939 (US 2008-0279042 A1—Storteig, et al).

UK Search Report for GB 0511248.7; Sep. 8, 2005.

Schmidt; "Solution for Seismic Source Registration"; WorldOil.com; 226(9), 1-3; Sep. 2005.

Gikas, et al.; "Reliabiliky Analysis in Dynamic Systems: Implications for Positioning Marine Seismic Networks"; Geophysics; vol. 64, No. 4, pp. 1014-1022; Jul./Aug. 1999.

Armstrong et al.; "The Best Prameter Subset Using the Chebychev Curve Fitting Criterion"; Mathematical Programming; vol. 27, No. 1, pp. 64-74; 1983.

* cited by examiner

ACTIVE STEERING FOR MARINE SEISMIC SOURCES

BACKGROUND OF THE INVENTION

1. Field of the Invention

This invention relates to seismic exploration and more specifically, to marine seismic survey systems.

2. Description of the Related Art

Marine seismic exploration investigates and maps the structure and character of subsurface geological formations underlying a body of water. For large survey areas, seismic vessels tow one or more seismic sources and multiple seismic streamer cables through the water. The seismic sources typically comprise compressed air guns for generating acoustic pulses in the water. The energy from these pulses propagates downwardly into the geological formations and is reflected upwardly from the interfaces between subsurface geological formations. The reflected energy is sensed with hydrophones attached to the seismic streamers, and data representing such energy is recorded and processed to provide information about the underlying geological features.

Three-dimensional (3-D) seismic surveys of a grid provide more information regarding the subsurface formations than two-dimensional seismic surveys. 3-D surveys may be conducted with up to twelve or more streamers that form an array covering a large area behind the vessel. The streamers typically vary in length between three and twelve kilometers. Tail buoys attached at the streamer distal ends carry radar reflectors, navigation equipment, and acoustic transponders. Hydrophones are positioned along each streamer and are wired together in receiver groups spaced along each streamer. The in-line interval between receiver groups ranges between about 3 and 25 meters, with 12.5 meters comprising typical interval spacing. Since the grid is often much wider than the array, the tow vessel must turn around and tow the array in laps across the grid, being careful not to overlap or leave large gaps between the laps across the grid.

A multiple streamer array requires diverters near the vessel to pull the streamers outwardly from the direct path behind the seismic tow vessel and to maintain the traverse or crossline spacing between individual streamers. Diverters rely on hydrodynamic lift created by forward motion through the water to pull the streamers outwardly and to maintain the transverse position relative to the vessel path. If forward motion changes due to ocean currents and other environmental factors, the diverters will not maintain the desired streamer position.

In 4-D geophysical imaging, a 3-D seismic survey is repeated over a grid that has been previously surveyed. This series of surveys taken at different times may show changes to the geophysical image over time caused, for example, by extraction of oil and gas from a deposit. It is important that the sources being used to generate the acoustical pulses be located as closely as possible to the same location as in previous surveys over the same grid. This, of course, has been impossible to accomplish in a marine survey because the acoustical source arrays are typically towed behind the tow vessel and are subject to wave and current movement.

In addition to the deployment and operation difficulties associated with towing multiple streamers, conventional techniques limit the ability to position source equipment and receivers in different relative positions and orientations. Because the sources and receivers are towed behind the same seismic vessel, array design is limited by the tow configuration. Each towed array is also subject to crosscurrents, wind, waves, shallow water, and navigation obstacles that limit the coverage provided by the survey system.

Conventionally, attempts to control the location of source arrays have included attaching the arrays to distance ropes running to other deflectors and tow cables. These attempts have not provided optimal control of the location of the source arrays under towing conditions. Furthermore, the distance ropes create a significant drag that must be overcome by the tow vessel and that places a great deal of tension on the towing cables and attachments.

Accordingly, a need exists for an improved techniques and equipment for conducting marine seismic operations. It would be an advantage if such techniques and equipment allowed the acoustic sources to be positioned in desired locations while being towed behind a vessel.

SUMMARY OF THE INVENTION

The present invention provides a seismic survey system for use in water that comprises a source array coupled to an independently steerable deflector device that controls the crossline position of the source array. While the deflector device is preferably connected between the tow cable (or umbilical) and the towed source array, the deflector device may also be placed at the distal end of the source array or contained within the source array.

So that the source array may be tracked as to its present position, a positioning system unit is mounted on the source array. The positioning unit system may be, for example, a global positioning system (GPS) unit, other satellite system, laser, acoustic network or other device that indicates position. The positioning unit provides a signal to a controller to inform the controller of the current position of the source array so that the controller can control the crossline position of the deflector device and the coupled source array. The controller may be positioned at a location selected from a towing vessel, the deflector, and combinations thereof. It should be recognized that reference to a "controller" encompasses not only a single controller, but also the use of multiple controllers since the distribution of control among multiple units at one or more locations, and one or more controllers controlling a single unit, may still function in the same way and achieve the same result as a single controller.

The deflector device preferably comprises a single wing in a generally vertical arrangement and a central body, but may also comprise an upper wing, a lower wing, and a central body, wherein the upper and lower wings are disposed on opposite sides of the central body in a generally vertical arrangement and wherein the wings move together in similar motion. Alternatively, the wings may be arranged horizontally, wherein the wings may move together in similar motion, or wherein one wing is fixed and the other wing is adjusted, or wherein each wing may be adjusted-independently. An actuator is disposed within or adjacent to the central body, wherein a controller sends a signal to the actuator, which moves the wing by either electrical or hydraulic action. The one or more wings have a combined surface area of between about 1 and about 7 square meters and may be made of a material selected from metal, plastic composite or combinations thereof. For example, the wing may be constructed of a metal skin covering a foam core.

Electrical power may be provided to the deflector from the tow vessel through the umbilical, from batteries or other electricity storage devices located on the deflector, and from a combination thereof.

The present invention may further comprise a second source array. More than one deflector device may be used, especially when there are multiple source arrays. Accordingly, the present invention also includes a second independently steerable deflector device coupled to a second source array for controlling a crossline position of the second source array.

Additionally, the present invention provides an obstruction avoidance system having an acoustical transducer and receiver coupled to the source array, and a controller, wherein the controller adjusts the deflector device to steer around an obstruction located by the acoustical transducer and receiver. Preferably, the acoustical transducer and receiver operate in a range typical for sonar type devices, and may be used to locate obstructions in or under the water such as, for example, installed constructions, moored devices, floating devices, lead-in cables and combinations thereof. The acoustic transducer and receiver may be pointed in a given direction or alternatively, the acoustic transducer and receiver may sweep in many directions. Alternatively, optical devices, such as lasers, may comprise the obstruction avoidance system.

Also included as the present invention is a method of positioning a source array in tow behind a vessel. The steps of this method include determining the crossline position of the source array, and independently steering a deflector device to position the source array in a desired crossline position. The method further includes using a controller for controlling the deflector device to reach the desired crossline position. A positioning system unit is used for determining the position of the source array and providing the position to the controller.

As previously discussed, the deflector that may be used in the method of the present invention preferably comprises a wing and an actuator to move the wing. The controller controls the actuator, which moves the wing, wherein the movement of the wing steers the source array.

The method of the present invention further provides a method for avoiding obstruction in or under the water. These steps include detecting acoustic signals or reflections indicating obstructions in the path of the source array and adjusting the deflector device to steer around an obstruction detected by the acoustical transducer and receiver.

The present invention further provides a system for changing the position of a source array towed by a vessel in a body of water having a deflector coupled to the source array. The deflector includes a wing that provides a lateral force to the source array as the source array is towed through the water, an actuator for controllably varying the angle between the deflector wing and the direction of tow of the vessel, and a sensor for measuring the wing angle. Additionally the deflector may include a positioning system for indicating the position of the deflector, and a controller for providing a command to the actuator for varying the angle between the deflector wing and the tow direction. Preferably, commands from the controller to the actuator cause the deflector to steer to a desired position and then maintain that position.

The deflector is stabilized against forces transverse to the direction of tow by drag forces resulting from towing the source array from the deflector. Further stabilization may be realized by having a lower end of the deflector that is weighted and an upper end that is buoyant.

As an alternative seismic survey system for use in water, the present invention provides a winch for controlling the position of a source array. The system comprises a source array towed by a first tow cable, a deflector towed by a second tow cable, a distance rope coupling the first and second tow cables, and a winch attached to the distance rope, wherein the winch controls a position of the source array. A positioning system receiver unit mounted on the source array and a controller are used for controlling the position of the source array.

The controller may be a computer, a distributed control system, an analogue control system or other controller known to those having ordinary skill in the art. The controller is positioned at a location selected from a towing vessel, in-sea (such as at the winch), and combinations thereof. The positioning system receiver unit attached to the source array provides a signal to inform the controller of the current location of the source array. A seismic source on the source array may be triggered when the source array is at a desired location.

The winch comprises any apparatus for varying the effective length of the rope. For example, the winch may include a reel for winding the distance rope onto the winch, an actuator for rotating the reel, and a housing adjacent to the reel. The actuator uses a motive force selected from electrical and hydraulic. The housing protects sensors, conductors, power sources and power storage units from the water and comprises a connector for connecting an umbilical containing conductors or fibre optics to the housing from the controller and power source on the tow vessel. Power may be supplied from the tow vessel to the winch through the umbilical/tow cable, from one or more batteries located on the winch, or from combinations thereof.

A source array comprises one or more sub-arrays. Source arrays that are steered to locations on only one side of the centreline of the tow vessel require only one deflector device to control the crossline position of the source array because the forces exerted upon the source array as the array is being towed through the water tend to force the source array to the centre line of the tow boat. Alternatively, if the source array will be steered to locations on both sides of the centreline of the tow vessel, then two deflector devices, one on each side of the source array, are required.

The system may further comprise an obstacle avoidance system comprising an acoustical transducer and receiver coupled to the source array, and a controller, wherein the controller adjusts the winch to steer around an obstruction located by the acoustical transducer and receiver. The acoustical transducer and receiver preferably operate in a range typical for sonar type devices.

The foregoing and other objects, features and advantages of the invention will be apparent from the following more particular description of a preferred embodiment of the invention, as illustrated in the accompanying drawings wherein like reference numbers represent like parts of the invention.

DETAILED DESCRIPTION

Figure 1:
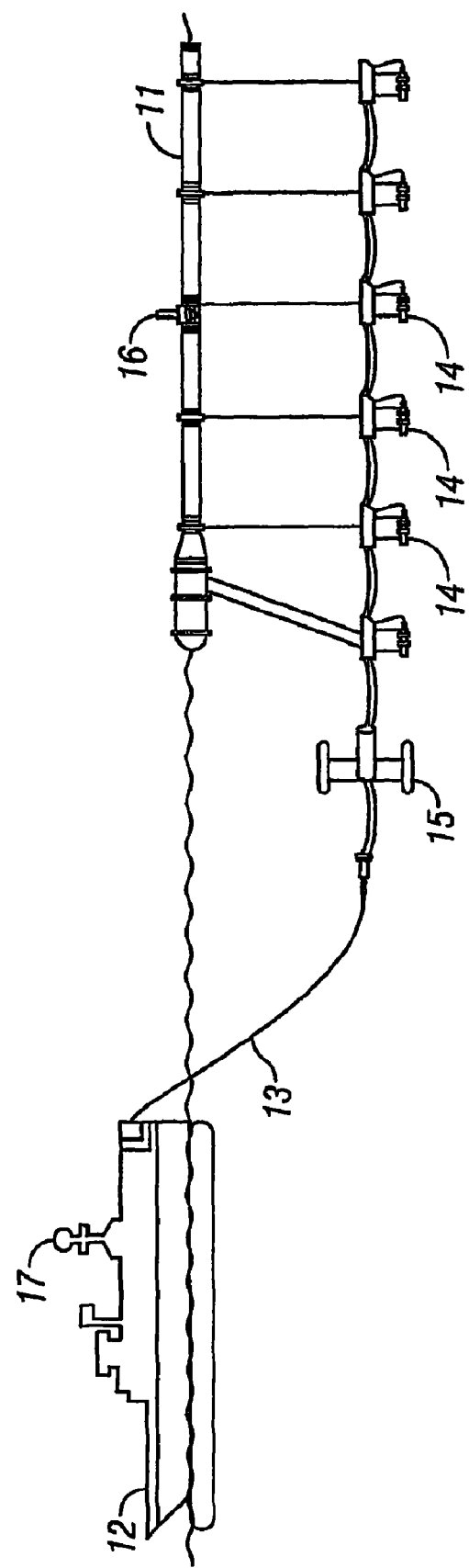
FIG. 1 is side view of a vessel towing a source array deployed with a deflector device in accordance with the present invention.

The present invention provides a seismic survey system that includes one or more source arrays towed behind a tow vessel. The system may be used for conducting seismic surveys of the subsurface geological formations that underlie a body of water. The system comprises a source array and an independently steerable deflector device that is coupled to the source array, preferably suspended from a float element of the source array or alternatively, from a separate independent float. The deflector device controls the position of the source array by exerting a lateral force against the source array as the deflector device is towed through the water. The deflector device preferably includes one wing that may be angularly adjusted to steer the source array to a desired position behind the tow vessel.

The deflector device is a hydrodynamic body that uses the water velocity, achieved by being towed by the tow vessel through the water, to generate a lateral force to steer the source array to the desired location. It should be noted that a towed source array generally moves along the centreline of the tow vessel due to the forces exerted on the source array by the water. Therefore, the defector device is used generally to steer the source array away from the centreline of the tow vessel to a desired position. The deflector device preferably comprises a single wing in a generally vertical arrangement and a central body, but may also comprise an upper wing, a lower wing, and a central body, wherein the upper and lower wings are disposed on opposite sides of the central body in a generally vertical arrangement and wherein the wings move together in similar motion. Alternatively, the wings may be arranged in a generally horizontal arrangement, wherein wings may move together in similar motion, or wherein one wing is fixed and the other wing is adjusted, or wherein each wing may be adjusted independently. The preferably streamlined central body has connection points that allow the deflector device to be connected to a tow cable from the tow vessel and to the source array. The deflector device may be positioned at the front of a source array, at the end of a source array, within the source array itself, or there may be multiple deflector devices positioned in some combination of these positions. A preferred location is at the front of the sub-array located furthest from the centreline of the tow vessel so that the source array trails the deflector device.

As the deflector device is towed through the water, the one or more wings produce a sideways force, or "lift", which moves the deflector laterally relative to the direction of tow. It is useful to define an "angle of attack" when discussing such lift, this angle being defined by the arc between the plane in which the trailing surface of the wing lies and the direction of tow through the water. The angle of attack will lie generally in a horizontal plane, although not necessarily so.

The central body preferably also contains the actuator that moves the wings as well as connections for an umbilical, or cables, hoses and combinations thereof, that carry control signals to and from the deflector device. The actuator may move the wings hydraulically or by an electric motor. An electric motor is preferred because an electric motor is smaller, simpler and less expensive to operate and maintain than a hydraulic system. The central body may also contain sensors that sense the motion and position of the wing and transmit that information to a controller discussed below. Alternatively, the actuator may be adjacent to the central body.

Electrical power may be supplied to the deflector through conductors in the umbilical, or cable, from the tow vessel, from batteries or other electricity storage devices located on the deflector, or from combinations thereof.

The wing or hydrofoil may have a profile that is symmetrical or that has camber. A profile with camber is preferred. The size of the wing, or alternatively the wings, will normally be in the range of between about one and seven square meters total for each deflector. The wing may be constructed of any material, but preferably the wing is made from metal, composite materials or combinations thereof. One preferred construction is a stainless steel skin covering a foam core. If weight is a concern, titanium may be used as a preferred material of construction. The central body and actuator are preferably constructed of stainless steel. The submerged weight of the deflector device is preferably between about 30 and about 150 kg. Foam filling the wings and central body may be used for buoyancy to counteract the weight of the metal used for constructing the deflector device.

A control system monitors the location of the source array and sends signals to the deflector device to steer the array to the desired location for the array. While the deflector may be used for positioning a source array relative to the vessel, it is preferably used for positioning the source array relative to the globe. Therefore, a positioning system unit is attached to the source array to provide the controller with the actual location of the source array. By knowing the exact location of the positioning system unit and knowing the in-line location of each acoustic source in the array relative to the positioning system unit, the controller can roughly determine the location of each acoustic source being towed behind the tow vessel. The positioning system unit may be, for example, a global positioning system (GPS) unit, other satellite positioning system, laser, an acoustic network, or any other type of unit known to one having ordinary skill in the art that may be used to determine a specific location.

The controller may compare the actual location of the positioning system unit with the desired location and then send a signal to the deflector device to steer the source array and thereby maintain or achieve the desired location. Since the controller is constantly monitoring the location of the source array, if the array is moved due to currents, waves, tides, winds or other outside forces, the controller may quickly sense the movement and instruct the deflector device to steer the source array back to the desired location. The controller may be located on the tow vessel communicating with the actuator that moves the wings on the deflector device. In a preferred embodiment, an on-board controller on the tow vessel communicates with a local controller in the central body of the deflector device. This local controller then transmits a signal to the actuator to move the wing and steer the source array to the optimum desired location. In this embodiment, the positioning system unit sends a signal to the navigation system of the tow vessel, which then communicates the location of the source array to the on-board controller. Using the navigation system of the tow vessel to receive the positioning system unit's signal is a preferred embodiment because the navigation system of the tow vessel conventionally has the capability of receiving and processing the signal from the positioning system unit. Alternatively, the capability of receiving and processing the signal from the positioning system unit may be made part of the on-board controller. Sensors in the central body may also monitor the position of the wing and/or the movement of the deflector device and transmit signals providing that information to the local controller and the on-board controller, if desired.

The on-board controller may be a computer, a distributed control system, an analogue control system or other control system known to those having ordinary skill in the art. The local controller may be one or more digital controllers, analogue controllers or combinations thereof. The on-board controller and the local controller may send control signals and receive transmitter signals or signals from each other by any means, including radio waves, electrical conductors, fibre optics or combinations thereof.

The seismic survey system may also include an obstructions avoidance system. An acoustical transducer and receiver may be mounted on the deflector device or on an adjacent source array. The acoustical transducer and receiver preferably operate in the range of typical sonar systems and may be directed in either one general direction or sweep in many directions. The acoustical transducer and receiver may be used to locate obstructions in or under the water such as, for example, undersea constructions, moored devices, free floating devices, tow cables and towed devices. When the acoustical transducer and receiver locates an obstruction, a signal may be sent to the controller (either the on-board controller or the local controller) and the controller may then signal the deflector device to adjust the wing and steer the source array away from or around the sensed obstruction. The acoustical transducer and receiver may be powered from the local in-sea electronics. Communication signals from the acoustical transducer and receiver to the controller may be transmitted by any means, including radio waves, optical fibres or electrical conductors, preferably by conductors in the umbilical attached to the deflector device. This obstructions avoidance system may be particularly useful during recovery or deployment of the array to avoid tangling of the tow cables.

If a tow vessel is towing more than one source array, each individual source array typically has one deflector device to control each source array's location. When the source array comprises two or more sub-arrays coupled together with distance ropes, only one of the coupled sub-arrays, typically the sub-array located furthest from the tow vessel's centreline, is provided with a deflector device to steer the source array.

When a tow vessel is towing only one source array comprising a plurality of sub-arrays, then both the sub-array furthest and the sub-array closest to the centreline of the tow vessel are provided with a deflector device to steer and maintain the source array to desired locations on either side of the tow vessel's centreline.

Alternatively, a winch may be used, instead of the deflector device, to control the location of a source array. Using a monowing or similar device to control the location of seismic steamers, an adjustable distance rope coupling a lead-in of a sub-array of the source array to the lead-in of a seismic streamer can control the position of the source array. The distance rope length is adjusted by means of a winch that is attached to the lead-in of the sub-array farthest from the centreline of the tow vessel. The adjustable distance rope that positions the source array may be shortened or lengthened by the winch, effectively steering the source array to a desired position. A controller may control the winch and thereby lengthen or shorten the length of the distance rope, winching the rope in or out to steer the source array to the desired position. As in the embodiment with the deflector device, a positioning system unit may be mounted on the source array to measure the actual location of the source array and to provide the controller with that information. However, instead of adjusting the position of the wing on the deflector device, the controller may adjust the effective length of the distance rope by winching the distance rope in or out. The distance rope may be made of rope, chain, wire or other form of material that may be winched and that is suitable for the sea environment as known to those having ordinary skill in the art.

It is an important advantage of the present invention that the deflector device, or alternatively the winch, steers the source array to a predetermined position and maintains that position while the array is being towed through the water. The predetermined position may be along a straight line or along any other track that has been defined either from experience or from previous surveys, or the position may be one that will simply enable optimum source positions in future surveys. Furthermore, during 4-D seismic surveys, it is important that the source array be located as closely as possible to the same locations used during previous surveys of the same grid. It is an advantage of the present invention that the deflector may be used to locate the source array at the same location as used during previous surveys of the grid.

Without the deflector device or winch steering the source array, the position of the source array is subject to the influence of currents, waves, wind and changes in the direction of the tow vessel. By exerting lateral force on the water, the deflector device or winch can steer the source array to the optimum predetermined position independent of the location of streamers, the speed of the tow vessel or other influences.

Another advantage of the present invention is that the increased control over the location of the source array allows the source array to be positioned closer to installed constructions, moored units or other known devices in or under the water without fear of entangling the tow cables or arrays with these obstacles. This provides increased seismic surveying of a grid by being able to gather seismic data from locations that before were avoided for fear of entangling the seismic survey equipment with obstacles in or under the water. Furthermore, the cross-line positioning control may be used to decrease the turning radius of the streamer vessel without tangling the streamers.

FIG. 1 is a side view of a vessel towing a source array deployed with a deflector device in accordance with the present invention. A tow vessel 12 tows a sub-array 11 of a source array by a tow cable 13. The sub-array 11 has several acoustic sources 14 suspended from the sub-array 11. These acoustic sources 14 are traditionally compressed air guns, which are fired to generate acoustical waves that are reflected from the subsurface geological features back to receivers (not shown) during a seismic exploration. The deflector device 15 is connected to the tow cable 13 between the vessel 12 and the source array 11 such that the source array 11 trails the deflector device 15. Also mounted on the source array 11 is a global positioning system (GPS) unit 16 that notifies the navigation system 17 of the tow vessel 12 of the exact location of the source array 11.

Figure 2B:
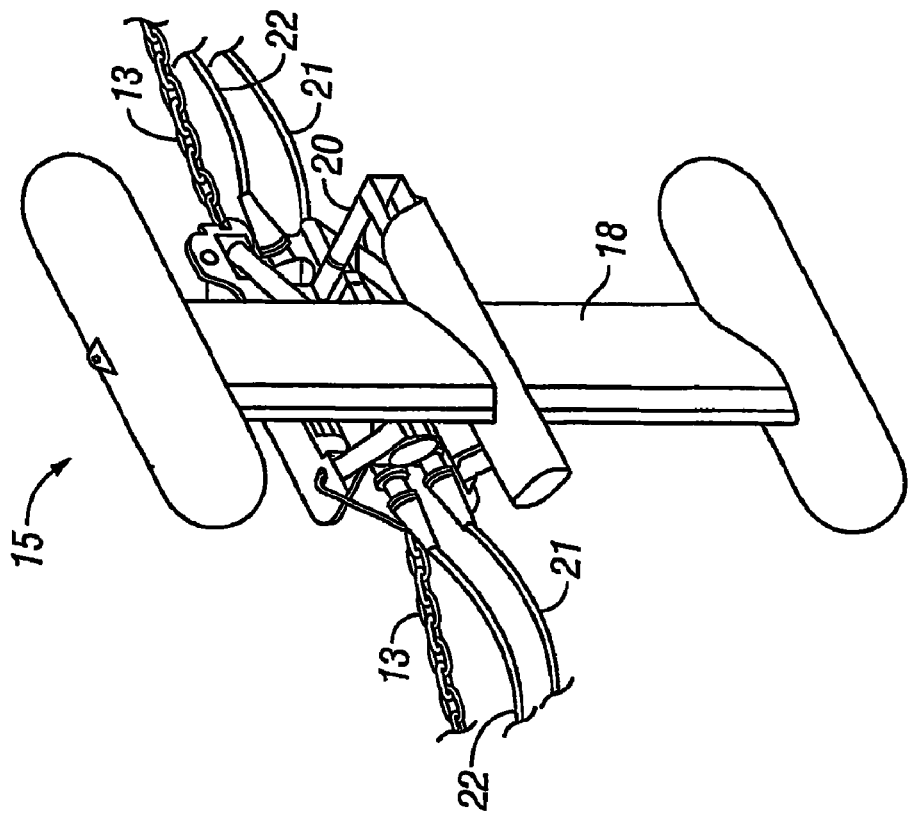
FIGS. 2A-2B are perspective views of each side of the deflector device.
Figure 2A:
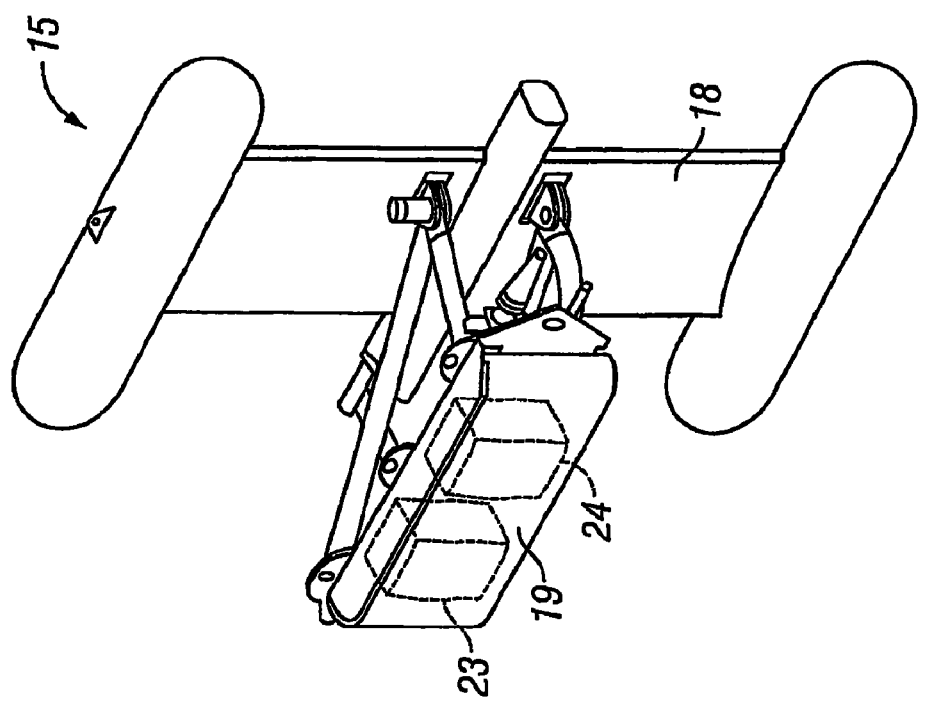

FIGS. 2A-2B are perspective views of each side of the deflector device 15. The moveable wing 18 is disposed adjacent to the streamlined central body 19. The actuator 20 moves the wing 18 about the wing's vertical axis. The central body 19 may also contain a local controller 24 and sensors (not shown) for monitoring the movement of the wing 18 and contain the motor (not shown) that drives the actuator 18 and optionally, batteries 23. The tow cable 13 attaches to the deflector for towing the deflector by the tow vessel and connects the deflector 15 to the sub-array 11 being towed. Electrical, optical or a combination of cables 22 thereof may be connected to the deflector to provide electrical power and to carry control signals. A high pressure hose 21 may also be connected to the deflector to provide high pressure air to the air guns.

Figure 3:
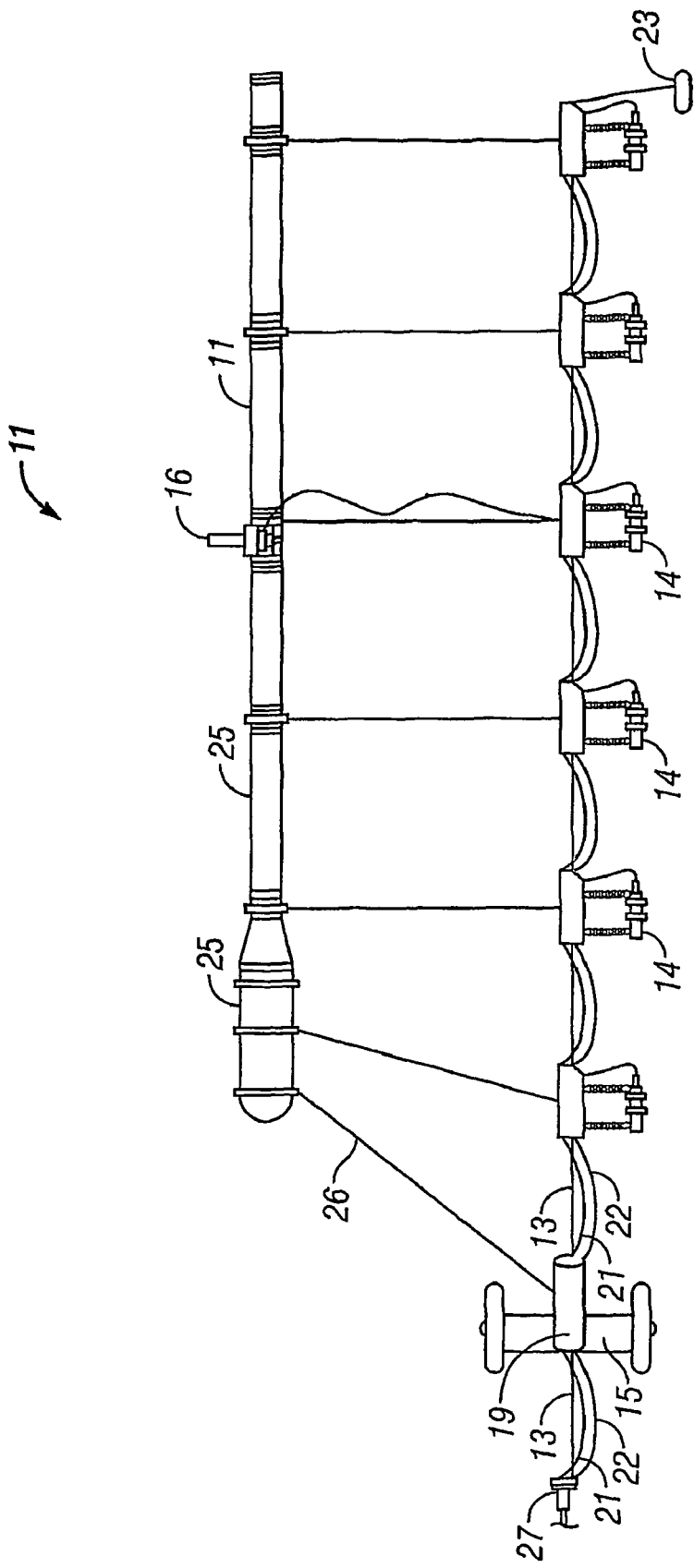
FIG. 3 is a side view of the deflector device coupled to the tow cable between the tow vessel and a sub-array in accordance with the present invention.

FIG. 3 is a side view of the deflector device coupled to the tow cable between the tow vessel and a sub-array in accordance with the present invention. The tow cable 13 tows the sub-assembly 11 and the deflector device 15 though the water. The central body 19 is adapted to be connected to the tow cable 13 between the tow vessel and the sub array 15. The electrical, optical, or combination of cables 22 may contain electrical power conductors, control signal conductors and fibre optics for sending and/or receiving electrical power and control signals and is shown connected to the central body 19. Also shown connected to the central body 19 is a high pressure hose 21 for supplying high pressure air to the air guns. The bulkhead 27 provides connections for the cable 22 and high pressure hose 21. Ropes 26 connected to the sub-array float 25 support the deflector device 15. Positioning units, GPS unit 16 and acoustic sensor 23 are shown mounted to the float 25 and acoustic sources 14 are shown suspended from the float 25.

Figure 4:
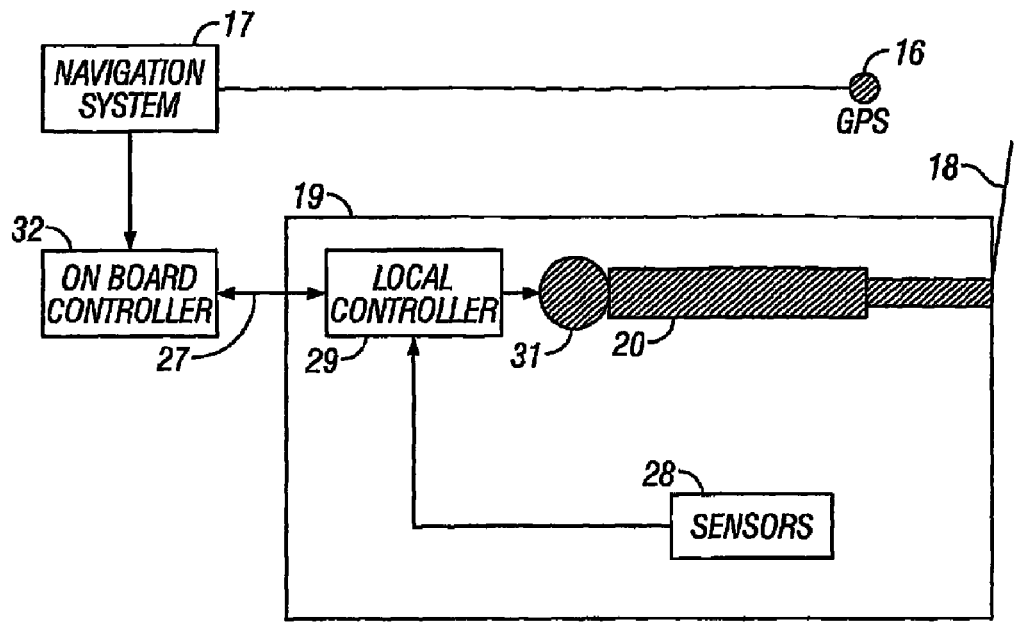
FIG. 4 is a schematic diagram of a control scheme to steer a source array in accordance with the present invention.

FIG. 4 is a schematic diagram of a control scheme to steer a source array in accordance with the present invention. The positioning unit 16, 17 mounted on the sub-array 11 (FIG. 1) transmits the position of the sub-array 11 to the navigation system 17 located on the tow vessel 12 (FIG. 1). The navigation system 17 provides the location information received from the positioning unit 16 to the on-board controller 32. The on-board controller 32 may be a computer, a distributed control system, an analogue control system or other control device known to those having ordinary skill in the art. The on-board controller 32 preferably communicates with the local controller 29 through the umbilical 27, but may communicate through a wireless transmission. The umbilical 27 contains conductors for providing power and control signals to and from the central body 19. The local controller 29 sends a signal to the electric motor 31 that moves the actuator 20, which in turn moves the wing 18. When the wing 18 moves, the lateral force imparted against the wing by the water steers the sub-array 11 to the desired position. Sensors 28 detect the angular position of the wing 18 and send this information back to the local controller 29 and, optionally, to the on-board controller 32 where it may be displayed for an operator to read.

Figure 5:
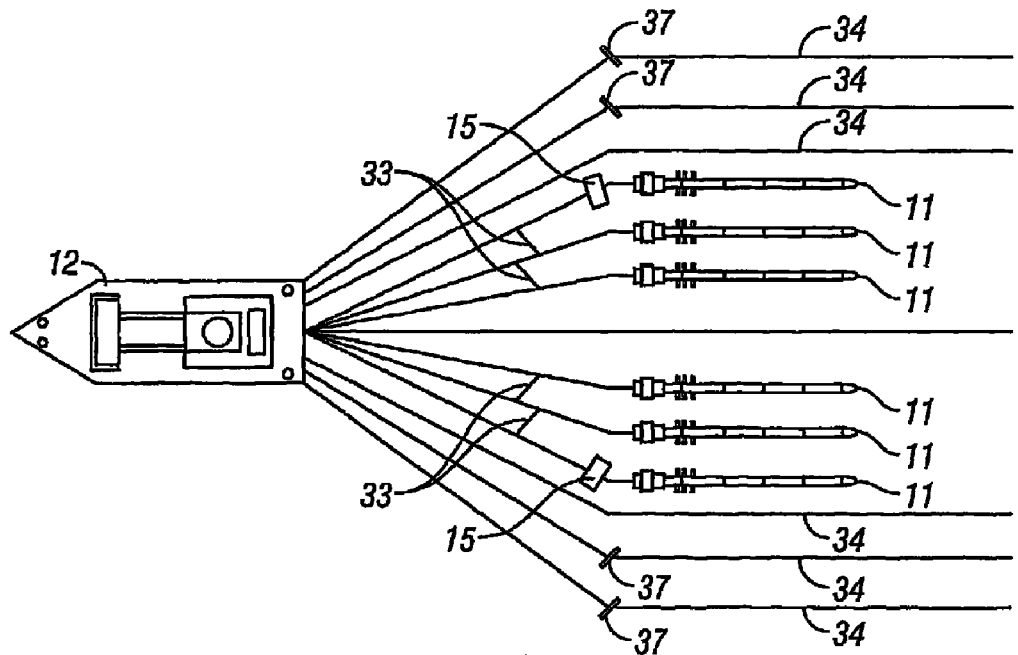
FIG. 5 is an aerial view of a marine seismic survey system with multiple source arrays deployed with distance ropes that couple adjacent sub-source arrays together, being steered with one deflector device on each source array in accordance with the present invention.

FIG. 5 is an aerial view of a marine seismic survey system with multiple source arrays deployed with distance ropes that couple adjacent sub-source arrays together, being steered with one deflector device on each of the source arrays in accordance with the present invention. Multiple sub-arrays 11 are shown forming two source arrays deployed with distance ropes 33 that couple adjacent sub-arrays 11 together. Each of the source arrays are shown being steered with one deflector device 15 attached to the sub-array 11 furthest from the centreline of the tow vessel 12. The distance ropes 33 maintain a set distance between each of the adjacent sub-arrays 11 coupled together with the distance ropes 33 or may optionally include a winch as previously described. One deflector device 15 may then be used to steer the coupled sub-arrays 11 as one unit to a desired position.

Figure 6:
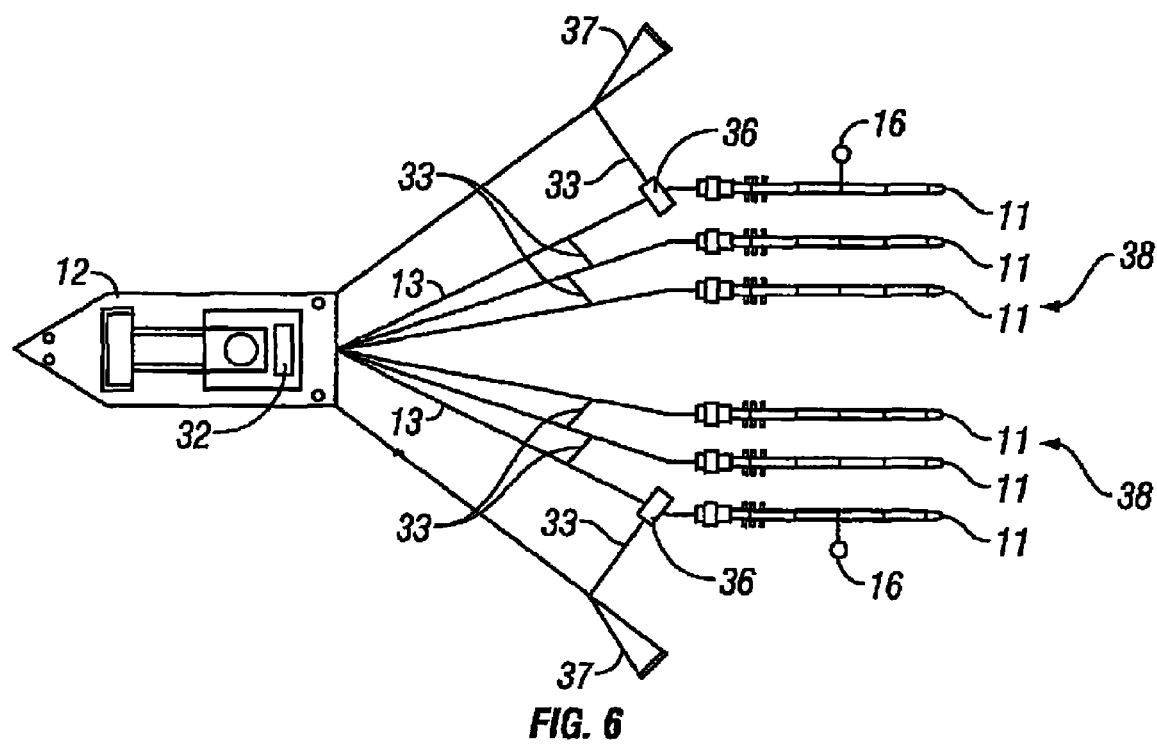
FIG. 6 is an aerial view of a marine seismic survey system with multiple sub-arrays coupled together with distance ropes and each source array being steered with winches in accordance with the present invention.

FIG. 6 is an aerial view of multiple sub-arrays 11 coupled together with distance ropes 33, with each source array being steered with a winch 36 in accordance with the present invention. In this embodiment, a distance rope 33 maintains the relative distance between a deflector 37 and the source arrays 38. The deflector 37 may be dedicated to the source arrays as shown, or alternatively, the deflector 37 may be connected with a seismic streamer cable that is connected to the source arrays with a distance rope as shown in FIG. 5. A winch 36 may adjust the length of the distance rope 33 by winching the distance rope 33 in or out. As the winch 36 winches the distance rope 33 in, the source array 38 moves towards the deflector 37. As the winch 36 winches the distance rope 33 out, the source array 38 moves away from the deflector 37. The on-board controller 32 receives a signal transmitted by the GPS unit 16 mounted on one of the sub-arrays 11. The on-board controller 32 then transmits a control signal to the winch 36 to winch the distance rope 33 in or out, thereby steering the source arrays 11 to a desired position or maintaining a desired position.

Figure 7:
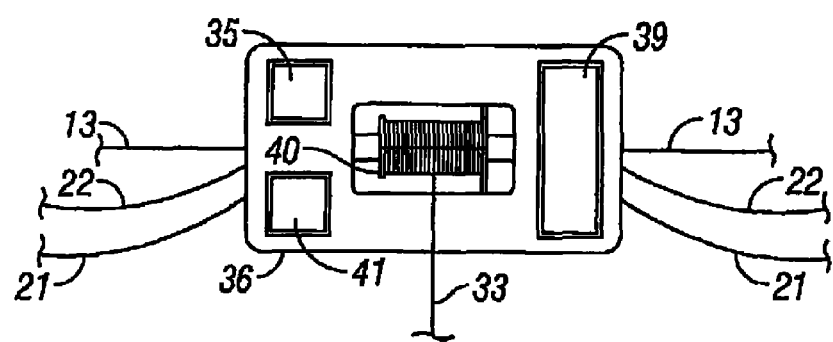
FIG. 7 is a top view of a winch used to steer a source array in accordance with the present invention.

FIG. 7 is a top view of a winch used to steer a source array in accordance with the present invention. The winch 36 is attached to the tow cable 13 between the tow vessel 12 and the sub-array 11 as shown in FIG. 6. The reel 40 rotates to take up or let out the distance rope 33. The reel 40 may be turned with an electric or hydraulic motor 39 powered from the cable 22. (FIG. 3) Batteries 35, or other energy storage unit, may also be included to provide power. A controller unit 41 may be provided for controlling the winch motor 39.

Figure 8:
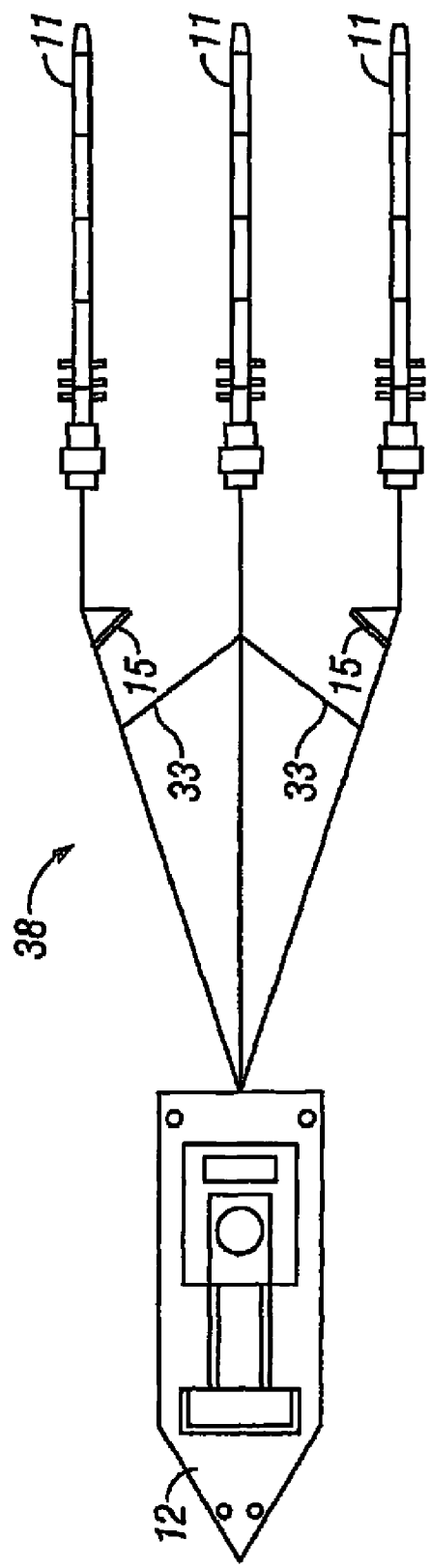
FIG. 8 is an aerial view of a tow vessel towing a single source array.

FIG. 8 is an aerial view of a tow vessel towing a single source array. The tow vessel 12 is towing a single source array 38 comprising three sub-arrays. Because of the forces exerted upon the source array 38 while it is being towed in the water, the source array 38 tends to follow the centreline of the tow vessel 12. To steer the source array 38 to either side of the centreline, two deflector devices must be provided, one of each of the sub-arrays 11 furthest from the centreline of the tow vessel 12. Alternatively, a winch 36 (FIG. 7) may replace the deflector devices 15. Alternatively, if the source array 38 is to be steered to only one side of the centreline of the tow vessel 12, then only one deflector device 15 would be required.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

The invention claim is:

1. A seismic survey system for use in water, comprising:
   a source array;
   an independently steerable deflector device coupled to the source array, wherein the deflector device controls a position of the source array by changing an angle of attack of the deflector device with respect to a direction of a tow while maintaining the source array in a substantially inline direction, and wherein the deflector device is submerged underwater;
   a positioning system to determine a location of the source array;
   an acoustical transducer and receiver coupled to the source array; and
   a controller for adjusting the deflector device to steer clear of an obstruction located by the acoustical transducer and receiver.

2. The seismic survey system of claim 1, wherein the source array trails directly behind the independently steerable deflector device in the inline direction.

3. The seismic survey system of claim 1, wherein the deflector device trails the source array in the inline direction.

4. The seismic survey system of claim 1, wherein the deflector device is disposed within the source array.

5. The seismic survey system of claim 1, wherein the positioning system comprises a positioning unit mounted on the source array, and wherein the positioning unit provides the controller with the location of the source array.

6. The seismic survey system of claim 5, wherein the positioning system is selected from a global positioning system, an acoustic network, and a laser system.

7. The seismic survey system of claim 5, wherein the positioning system is a satellite positioning system.

8. The seismic survey system of claim 1, wherein the controller controls the position of the deflector device.

9. The seismic survey system of claim 8, further comprising:
a positioning unit attached to the source array, wherein the positioning unit provides a signal to inform the controller of a current position of the source array.

10. The seismic survey system of claim 9, wherein a seismic source on the source array is triggered when the source array is at a desired position.

11. The seismic survey system of claim 10, wherein the desired position is a set distance from an edge of a previous seismic survey.

12. The seismic survey system of claim 11, wherein the desired position avoids gaps in coverage.

13. The seismic survey system of claim 10, wherein the desired position is the same position as in a previous seismic survey.

14. The seismic survey system of claim 1, wherein the controller is positioned at a location selected from a towing vessel, the deflector device, and combinations thereof.

15. The seismic survey system of claim 1, wherein the deflector device comprises:
one or more wings; and
a central body, wherein the one or more wings are disposed adjacent to the central body.

16. The seismic survey system of claim 15, wherein the one or more wings are in a generally vertical arrangement.

17. The seismic survey system of claim 15, wherein the one or more wings are in a generally horizontal arrangement.

18. The seismic survey system of claim 15, further comprising:
an actuator disposed adjacent the central body, wherein the controller sends a signal to the actuator, and wherein the actuator moves the one or more wings.

19. The seismic survey system of claim 18, wherein the actuator uses a motive force selected from electrical and hydraulic.

20. The seismic survey system of claim 18, wherein the central body and the actuator are made of a material selected from metal, composite and combinations thereof.

21. The seismic survey system of claim 15, wherein the total area of the one or more wings is between about 1 and about 7 square meters.

22. The seismic survey system of claim 15, wherein the one or more wings are constructed of a material selected from metal, composite or combinations thereof.

23. The seismic survey system of claim 15, wherein the one or more wings are constructed of a metal skin covering a foam core.

24. The seismic survey system of claim 23, wherein the metal skin is selected from titanium and stainless steel.

25. The seismic survey system of claim 1, wherein the source array comprises one or more sub-arrays and wherein the sub-arrays are coupled to adjacent sub-arrays within the source array by a distance rope.

26. The seismic survey system of claim 1, further comprising:
a second independently steerable deflector device coupled to a second source array for controlling a second position of the second source array.

27. The seismic survey system of claim 1, wherein the acoustical transducer and receiver are sonar devices.

28. The seismic survey system of claim 1, wherein the obstruction is selected from a group consisting of installed constructions, moored devices, floating devices, lead-in cables, umbilicals, towed equipment and combinations thereof.

29. The seismic survey system of claim 1, wherein the acoustic transducer and receiver are pointed in a given direction.

30. The seismic survey system of claim 1, wherein the acoustic transducer and receiver sweeps in many directions.

31. A seismic survey system for use in water, comprising:
a source array having a first sub-array and a second sub-array;
a positioning system to determine a location of the source array;
a first deflector device coupled to the first sub-array;
a second deflector device coupled to the second sub-array, wherein the first and second deflector devices are:
configured to control a position of the source array by changing an angle of attack of the first and second deflector devices with respect to a direction of a tow while maintaining the source array in a substantially inline direction;
configured to position the source array on both sides of a center line of a towing vessel during a seismic survey; and
submerged underwater;
an acoustical transducer and receiver coupled to the source array; and
a controller, wherein the controller adjusts the first deflector device and the second deflector device to steer clear of an obstruction located by the acoustical transducer and receiver.

32. The seismic survey system of claim 1, wherein the source array comprises:
a float disposed on the surface of the water;
one or more sources coupled to the float such that the sources are suspended below the float; and
wherein the deflector device is also suspended below the float.

* * * * *